(12) United States Patent
Lee

(10) Patent No.: US 10,502,924 B2
(45) Date of Patent: Dec. 10, 2019

(54) LENS DRIVING DEVICE, CAMERA MODULE, AND OPTICAL DEVICE

(71) Applicant: LG INNOTEK CO., LTD., Seoul (KR)

(72) Inventor: Kap Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/743,582

(22) PCT Filed: Jul. 8, 2016

(86) PCT No.: PCT/KR2016/007420
§ 371 (c)(1),
(2) Date: Jan. 10, 2018

(87) PCT Pub. No.: WO2017/010745
PCT Pub. Date: Jan. 19, 2017

(65) Prior Publication Data
US 2018/0203203 A1    Jul. 19, 2018

(30) Foreign Application Priority Data

Jul. 10, 2015  (KR) ........................ 10-2015-0098267
Aug. 18, 2015  (KR) ........................ 10-2015-0116342

(51) Int. Cl.
*G02B 7/09*    (2006.01)
*G03B 3/10*    (2006.01)
(Continued)

(52) U.S. Cl.
CPC ................. *G02B 7/09* (2013.01); *G03B 3/10* (2013.01); *G03B 5/02* (2013.01); *H02K 41/0356* (2013.01);
(Continued)

(58) Field of Classification Search
CPC ... G02B 7/09; G03B 5/02; G03B 3/10; G03B 2205/0015; G03B 2205/0069;
(Continued)

(56) References Cited

U.S. PATENT DOCUMENTS

2014/0139693 A1*  5/2014  Takei ................. G03B 5/00
                                                     348/208.11

FOREIGN PATENT DOCUMENTS

JP       3798639 B2    7/2006
JP       4560840 B2   10/2010
(Continued)

OTHER PUBLICATIONS

International Search Report in International Application No. PCT/KR2016/007420, filed Jul. 8, 2016.

*Primary Examiner* — Tuyen Tra
(74) *Attorney, Agent, or Firm* — Saliwanchik, Lloyd & Eisenschenk

(57) ABSTRACT

The present embodiment relates to a lens driving device comprising: a first housing; a second housing disposed at an inner side of the first housing; a bobbin disposed a an inner side of the second housing; a first coil disposed on the bobbin; a magnet disposed on the second housing, and facing the first coil; a second coil facing the magnet; a first support member coupled to the bobbin and the second housing; and a second support member coupled to the first housing and the second housing, wherein the second coil is disposed to be spaced apart from the first housing.

20 Claims, 5 Drawing Sheets

(51) Int. Cl.
*H04N 5/232* (2006.01)
*G03B 5/02* (2006.01)
*H04N 5/225* (2006.01)
*H02K 41/035* (2006.01)

(52) U.S. Cl.
CPC ......... *H04N 5/2253* (2013.01); *H04N 5/2254* (2013.01); *H04N 5/232* (2013.01); *H04N 5/23212* (2013.01); *H04N 5/23287* (2013.01); *G03B 2205/0015* (2013.01); *G03B 2205/0023* (2013.01); *G03B 2205/0069* (2013.01)

(58) Field of Classification Search
CPC ....... G03B 2205/0023; H04N 5/23287; H04N 5/2253; H04N 5/23212; H04N 5/2254; H04N 5/232; H02K 41/0356
USPC ................................ 359/642, 811, 819, 823
See application file for complete search history.

(56) References Cited

FOREIGN PATENT DOCUMENTS

| KR | 10-1036010 B1 | 5/2011 |
| KR | 10-1204161 B1 | 11/2012 |
| KR | 10-2014-0003216 A | 1/2014 |

\* cited by examiner

LENS DRIVING DEVICE, CAMERA MODULE, AND OPTICAL DEVICE

CROSS-REFERENCE TO RELATED APPLICATIONS

This application is the U.S. national stage application of International Patent Application No. PCT/KR2016/007420, filed Jul. 8, 2016, which claims priority to Korean Application Nos. 10-2015-0098267, filed Jul. 10, 2015, and 10-2015-0116342, filed Aug. 18, 2015, the disclosures of each of which are incorporated herein by reference in their entirety.

TECHNICAL FIELD

The teachings in accordance with exemplary and non-limiting embodiments of this invention relate generally to a lens driving device, a camera module, and an optical device.

BACKGROUND ART

Concomitant with widely generalized dissemination of various mobile terminals and commercialization of wireless Internet services, demands by consumers related to mobile terminals are diversified to prompt various types of peripheral devices or additional equipment to be mounted on mobile terminals. Inter alia, camera modules may be representative items photographing an object in a still picture or a video.

Meantime, camera modules equipped with AF (Auto Focus) function and handshake correction (OIS: Optical Image Stabilization) function are recently used. On the other hand, the conventional camera module performs the OIS function by using a shift method where a lens is operated to left/right sides. However, the camera module performing the OIS function using the shift method suffers from disadvantages/problems where an image is distorted at an outside of corrected image.

DETAILED DESCRIPTION OF THE INVENTION

Technical Subject

In order to solve the abovementioned problems/disadvantages, exemplary embodiments of the present invention provide a lens driving device performing the OIS function by moving a lens using a tilt method.

Furthermore, in order to solve the abovementioned problems/disadvantages, exemplary embodiments of the present invention provide a camera module including the lens driving device, and an optical device.

Technical Solution

In one general aspect of the present invention, there is provided a lens driving device comprising: a first housing; a second housing disposed at an inner side of the first housing; a bobbin disposed a an inner side of the second housing; a first coil disposed on the bobbin; a magnet disposed on the second housing, and facing the first coil; a second coil facing the magnet; a first support member coupled to the bobbin and the second housing; and a second support member coupled to the first housing and the second housing, wherein the second coil is disposed by being spaced apart from the first housing.

Preferably, but not necessarily, the second coil may be disposed downwardly by being spaced apart from the magnet.

Preferably, but not necessarily, the magnet may be fixed to the second housing in order to allow an entire bottom surface of the magnet to be exposed to the second coil.

Preferably, but not necessarily, at least a portion of the magnet may be more protruded downwards than the second housing.

Preferably, but not necessarily, the lens driving device further comprises a base at a bottom side of the second housing, the base being disposed to be spaced apart from the second housing, wherein the second coil is disposed at the base.

Preferably, but not necessarily, the lens driving device further comprises a cover member formed with a bottom-opened type inner space to be coupled at a bottom end with the base, wherein the first housing is disposed at an inner lateral surface of the cover member.

Preferably, but not necessarily, the second coil may be formed on a substrate with an FP (Fine Pattern) coil.

Preferably, but not necessarily, the second support member may include a second upper support portion coupled to an upper surface of the first housing and an upper surface of the second housing, and a second bottom support portion coupled to a bottom surface of the first housing and a bottom surface of the second housing.

Preferably, but not necessarily, the first coil may be disposed at an outer surface of the bobbin, and the magnet may be disposed at an inner surface of the second housing to face the first coil.

Preferably, but not necessarily, the first coil may be accommodated in a coil accommodation groove formed by being recessed inwardly at an outer lateral surface of the bobbin, and an outer lateral surface of the first coil and the outer lateral surface of the bobbin are disposed on a same planar surface.

Preferably, but not necessarily, the first coil may be spaced apart from a bottom end of the bobbin.

Preferably, but not necessarily, the first support member may movably support the bobbin, the bobbin coupled to the first support member being moved to an optical direction relative to the second housing.

Preferably, but not necessarily, the second support member may be such that the second housing tiltably supports the first housing.

Preferably, but not necessarily, the bobbin may be also integrally tilted with the second housing when the second housing is tilted.

Preferably, but not necessarily, the magnet may include a first magnet portion and a second magnet portion, each disposed to face the other, and the second coil may include a first coil portion opposite to the first magnet portion, and a second coil portion opposite to the second magnet portion, and a direction of a current applied to the first coil portion is opposite to a direction of a current applied to the second coil portion.

Preferably, but not necessarily, the first support member may include a first upper support portion coupled to an upper surface of bobbin and to an upper surface of the second housing, and a first bottom support portion coupled to a bottom surface of bobbin and to a bottom surface of the second housing.

Preferably, but not necessarily, the lens driving device may further comprise an AF sensor disposed at the bobbin to detect the magnet.

Preferably, but not necessarily, the lens driving device may further comprise an OIS sensor disposed at the first housing or at the base to detect the magnet.

In another general aspect of the present invention, there is provided a camera module, comprising: a PCB mounted with an image sensor; a lens module disposed at an upper side of the image sensor; a first housing disposed at an upper side of the PCB; a second housing disposed at an inner side of the first housing; a bobbin disposed at an inner side of the second housing to accommodate the lens module; a first coil disposed at the bobbin; a magnet disposed at the second housing to be opposite to the first coil; a second coil opposite to the magnet; a first support member coupled to the bobbin and the second housing; and a second support member coupled to the first housing and the second housing, wherein the second coil is disposed to be spaced apart from the first housing.

In another general aspect of the present invention, there is provided an optical device including a main body, a camera module disposed at the main body to photograph an image of an object, and a display portion outputting the image photographed by the camera module, wherein the camera module comprises: a PCB mounted with an image sensor; a lens module disposed at an upper side of the image sensor; a first housing disposed at an upper side of the PCB; a second housing disposed at an inner side of the first housing; a bobbin disposed at an inner side of the second housing to accommodate the lens module; a first coil disposed at the bobbin; a magnet disposed at the second housing to be opposite to the first coil; a second coil opposite to the magnet; a first support member coupled to the bobbin and the second housing; and a second support member coupled to the first housing and the second housing, wherein the second coil is disposed to be spaced apart from the first housing.

The lens driving device according to a first exemplary embodiment of the present invention may comprise: a bobbin accommodating a lens module at an inner side; a first driving portion disposed at the bobbin; an inside housing disposed at an outside of the bobbin; a second driving portion disposed at the inside housing to move the first driving portion through an interaction with the first driving portion; a third driving portion moving the second driving portion through an interaction with the second driving portion; an outside housing disposed at an outside of the inside housing; a first support member elastically connecting the bobbin and the inside housing; and a second support member elastically connecting the inside housing and the outside housing.

Preferably, but not necessarily, the second support member may include a second upper side support member coupling an upper surface of the inside housing and an upper surface of the outside housing, and a second bottom side support member coupling a bottom side of the inside housing and a bottom side of the second housing.

Preferably, but not necessarily, the third driving portion may be disposed to be downwardly spaced apart from the second driving portion.

Preferably, but not necessarily, the second driving portion may be fixed to the inside housing in order to expose an entire bottom surface of the second driving portion to the third driving portion.

Preferably, but not necessarily, the second driving portion may be fixed to an inner side of the inside housing to allow at least a portion of inside housing to be protruded downwardly.

Preferably, but not necessarily, a base may be further included that is disposed at a bottom side of the outside housing, and the third driving portion may be formed with an FP coil to be disposed at an upper surface of the base while being mounted to a circuit substrate.

Preferably, but not necessarily, a cover member may be further included that has a bottom-opened inner space to be coupled to the base, and the outside housing may be disposed at an inner sider surface of the cover member.

Preferably, but not necessarily, the first driving portion may be disposed at an accommodation groove of the first driving portion formed by being recessed inwardly at an outside surface of the bobbin, and an outside surface of the first driving portion and an outer surface of the bobbin may form a planar surface.

Preferably, but not necessarily, the bobbin may be supported by the inside housing to be movable to an optical axis direction of the lens module.

Preferably, but not necessarily, the inside housing may be coupled to the outside housing to tiltably support the outside housing.

Preferably, but not necessarily, the second driving portion may include a first magnet and a second magnet spaced apart from the first magnet, wherein the third driving portion may include a first coil opposite to the first magnet, and a second coil opposite to the second magnet, and wherein a direction of current applied to the first coil and the second coil may be separately controlled.

Preferably, but not necessarily, the first support member may include a first upper support member coupling an upper surface of bobbin and to an upper surface of inside housing, and a first bottom support member coupling a bottom surface of bobbin and to a bottom surface of inside housing.

Preferably, but not necessarily, the first driving portion and the third driving portion may include a coil, and the second driving portion may include a magnet.

A camera module according to a first exemplary embodiment of the present invention may comprise: a bobbin accommodating a lens module at an inside thereof; a first driving portion disposed at the bobbin; an inside housing disposed at an outside of the bobbin; a second driving portion disposed at the inside housing to move the first driving portion through interaction with the first driving portion; a third driving portion moving the second driving portion through interaction with the second driving portion; an outside housing disposed at an outside of the inside housing; a first support member elastically connecting the bobbin with the inside housing; and a second support member elastically connecting the inside housing with the outside housing.

Preferably, but not necessarily, an optical device according to a first exemplary embodiment of the present invention comprising: a main body; a display portion arranged at a bottom surface of the main body to display information; and a camera module mounted at the main body to photograph an image or a photograph, wherein the camera module includes; a bobbin accommodating a lens module at an inside thereof; a first driving portion disposed at the bobbin; an inside housing disposed at an outside of the bobbin; a second driving portion disposed at the inside housing to move the first driving portion through interaction with the first driving portion; a third driving portion moving the second driving portion through interaction with the second driving portion; an outside housing disposed at an outside of the inside housing; a first support member elastically connecting the bobbin with the inside housing; and a second support member elastically connecting the inside housing with the outside housing.

Preferably, but not necessarily, a camera module according to a second exemplary embodiment of the present invention comprising: a camera module; a first substrate mounted at an upper surface with an image sensor and coupled by a bottom surface of the camera module; and an OIS actuator supporting the first substrate at a bottom side to selectively move the first substrate.

Preferably, but not necessarily, the OIS actuator may include a plate supporting a bottom surface of the first substrate, a third driving portion disposed at the plate; and a fourth driving portion moving the third driving portion through electromagnetic interaction.

Preferably, but not necessarily, the OIS actuator may further include a second substrate disposed with the fourth driving portion and disposed at a bottom side of the plate.

Preferably, but not necessarily, the OIS actuator may further include a bottom case disposed at a bottom side of the second substrate, and an upper case coupled with the bottom case, wherein the plate and the second substrate are disposed at an inner space formed by the bottom case and the upper case, and at least a portion of the plate may be vertically overlapped with the upper case.

Preferably, but not necessarily, the OIS actuator may further include a sensor portion detecting movement or position of the plate relative to the second substrate.

Preferably, but not necessarily, the sensor portion may include a sensing magnet disposed at the plate, and a Hall sensor disposed at the second substrate to detect the sensing magnet.

Preferably, but not necessarily, the sensing magnet may include a first sensing magnet disposed at x axis of tilt center at the plate, and a second sensing magnet disposed at y axis of tilt center at the plate.

Preferably, but not necessarily, the Hall sensor may include a first Hall sensor opposite to the first sensing magnet, and a second Hall sensor opposite to the second sensing magnet.

Preferably, but not necessarily, the plate may include a first lateral portion disposed with the sensing magnet, and a second lateral portion not disposed with the sensing magnet and disposed opposite to the first lateral portion, wherein the third driving portion includes a first driving magnet disposed at the first lateral portion and a second driving magnet disposed at the second lateral portion, where the first driving magnet and the second driving magnet may be asymmetrical.

Preferably, but not necessarily, the first driving magnet may be provided in a plural number, and the sensing magnet may be disposed between the plurality of first driving magnets.

Preferably, but not necessarily, the OIS actuator may further include a support member elastically connecting the plate and the bottom case, wherein the support member may be coupled to an upper surface of the plate and may be coupled to a lug of the bottom case through a hollow hole of the plate.

Preferably, but not necessarily, at least a portion of the upper surface of the plate may be disposed with a step-down staircase portion, and the support member may be coupled at the staircase portion to the plate.

Preferably, but not necessarily, the third driving portion may include a magnet, and the fourth driving portion may include a coil.

Preferably, but not necessarily, the OIS actuator may tilt the first substrate.

Preferably, but not necessarily, the camera module may include a bobbin accommodating a lens module at an inside thereof, a first driving portion disposed at the bobbin, a housing disposed at an outside of the bobbin and a second driving portion disposed at the housing to move the first driving portion through an electromagnetic interaction.

Preferably, but not necessarily, the first substrate may include a main body portion coupled to a bottom surface of the camera module, a terminal portion disposed at an outside of the main body portion to be connected to an outside device and a connection portion connecting the main body portion and the terminal portion, wherein the connection portion may elastically support the main body portion relative to the terminal portion.

Preferably, but not necessarily, at least a portion of the first substrate may be formed with an FPCB (Flexible Printed Circuit Board).

Preferably, but not necessarily, the camera module may further comprise: a cover member including an upper plate, a lateral plate extended from the upper plate and an inner space formed at an inside of the upper plate and an inside of the lateral plate, wherein the a bottom end of the lateral plate at the cover member may be coupled to the OIS actuator.

Preferably, but not necessarily, at least a portion of the lateral plate at the cover member may be extended to an outside toward a bottom side.

An optical device according to a second exemplary embodiment of the present invention may comprise: a main body; a display portion arranged at one surface of the main body to display information; and a camera module mounted at the main body to photograph an image or a photograph, wherein the camera module includes: a camera module; a first substrate mounted with an image sensor to be coupled at a bottom surface of the camera module; and an OIS actuator supporting the first substrate at a bottom side to selectively move the first substrate.

Advantageous Effects

Through the present invention, an image distortion phenomenon generated from an outside of an image corrected in handshake can be minimized.

BEST MODE

Figure 1:
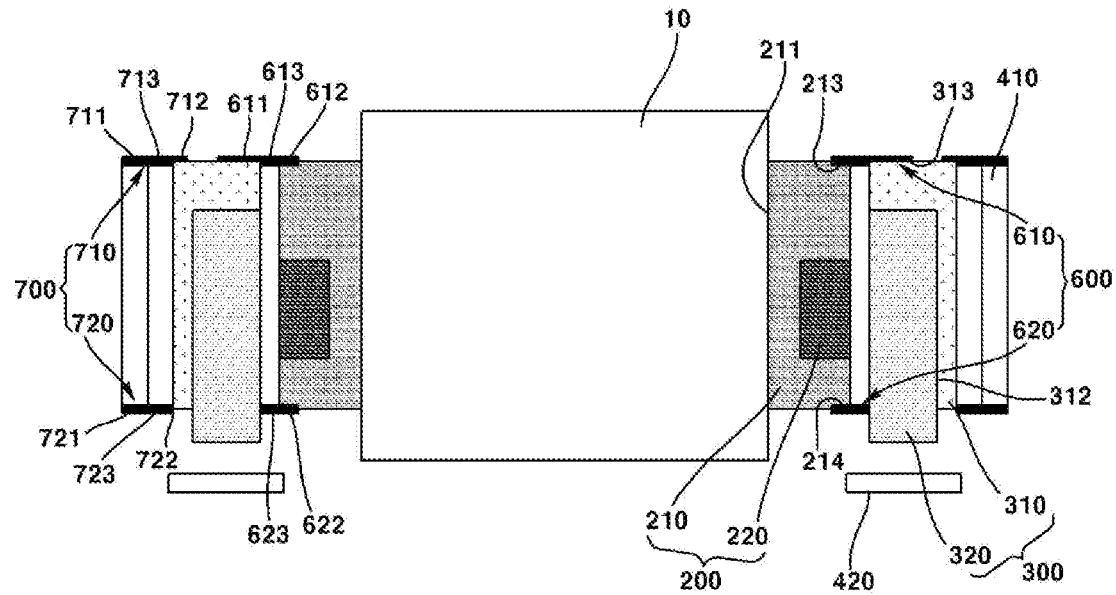
FIG. 1 is a cross-sectional view illustrating a lens driving device according to a first exemplary embodiment of the present invention.

Some of the exemplary embodiments of the present invention will be described with the accompanying drawings. Detailed descriptions of well-known functions, configurations or constructions are omitted for brevity and clarity so as not to obscure the description of the present disclosure with unnecessary detail. Furthermore, throughout the descriptions, the same reference numerals will be assigned to the same elements in the explanations of the figures.

Furthermore, the terms "first," "second," "A", "B", (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. "Coupled" may mean that two or more elements are in direct physical and/or electrical contact. However, coupled may also mean that two or more elements may not be in direct contact with each other, but yet may still cooperate and/or interact with each other. For example, "coupled", "joined" and "connected" may mean that two or more elements do not contact each other but are indirectly joined together via another element or intermediate elements.

An "optical axis direction" as used hereinafter is defined as an optical axis direction of a lens module in a state of being coupled to a lens driving unit.

An "auto focus function" as used hereinafter is defined as a function of matching a focus relative to an object by adjusting a distance from an image sensor by moving to an optical axis direction a lens module in response to a distance to the object in order to obtain a clear image of the object on the image sensor. Meantime, the "auto focus" may be interchangeably used with "AF".

A "handshake correction function" as used hereinafter is defined as a function of moving or tilting a lens module to a direction perpendicular to an optical axis direction in order to offset vibration (movement) generated on the image sensor by an external force. Meantime, the "handshake correction" may be interchangeably used with an "OIS (Optical Image Stabilization)".

Hereinafter, any one of an AF sensor (not shown) and an OIS sensor (not shown) may be called "a first sensor", and the other one may be called "a second sensor".

Hereinafter, any one of a first coil (220), a magnet (320) and a second coil (420) may be called "a first driving portion", the other one may be called "a second driving portion" and the remaining other one may be called "a third driving portion".

Hereinafter, a first housing (410) may be called "an outside housing", and "a second housing" may be called "an inside housing".

Hereinafter, a first support member (600) may be called "an inside support member" and a second support member may be called "an outside support member".

Now, a configuration of an optical device according to a first exemplary embodiment of the present invention will be described hereinafter.

The optical device according to an exemplary embodiment of the present invention may be a hand phone, a mobile phone, a smart phone, a portable smart device, a digital camera, a notebook computer (laptop computer), a PMP (Portable Multimedia Player) and a navigation device. However, the present invention is not limited thereto, and may include any device capable of photographing an image or a photograph.

The optical device according to an exemplary embodiment of the present invention may include a main body (not shown), a display portion (not shown) disposed at one surface of the main body to display information, and a camera (not shown) disposed on the main body to photograph an image or a photograph.

Hereinafter, configuration of camera module according to a first exemplary embodiment of the present invention will be described.

The camera module may include a lens driving device (not shown), a lens module (10), an infrared cut-off filter (not shown), a PCB (Printed Circuit Board, not shown), an image sensor (not shown) and a controller (not shown).

The lens module (10) may include one or more lenses (not shown) and a lens barrel accommodating one or more lenses. However, one element of the lens module (10) is not limited by the lens barrel, and any holder structure capable of supporting one or more lenses will suffice. The lens module (10) may move along with the lens driving device by being coupled to the lens driving device. The lens module (10) may be screw-coupled with a lens driving device, for example. The lens module (10) may be attached to a lens driving device by an UV hardening epoxy, for example. The lens module (10) may be coupled to an inside of the lens driving device, for example. Meantime, a light having passed the lens module (10) may be irradiated on the image sensor.

The infrared cut-off filter may serve to prevent a light of infrared ray region from entering the image sensor. The infrared cut-off filter may be interposed between the lens module (10) and the image sensor, for example. The infrared cut-off filter may be mounted on a base (not shown), and may be coupled with a holder member (not shown). The infrared cut-off filter may be installed at a hole (not shown) formed at a center of the base. The infrared cut-off filter may be formed with a film material or a glass material, for example. Meantime, the infrared cut-off filter may be formed by allowing an infrared cut-off coating material to be coated on a plate-shaped optical filter such as an imaging plane protection cover glass or a cover glass, for example.

The PCB may support the lens driving device. The PCB may be mounted with an image sensor. To be more specific, an upper surface of the PCB may be disposed with the lens driving device, and an upper inside of the PCB may be disposed with an image sensor. Furthermore, an upper external side of the PCB may be coupled by a sensor holder (not shown), and the sensor holder may be coupled thereon with the lens driving device. Through this structure, a light having passed the lens module (10) accommodated inside the lens driving device may be irradiated onto the image sensor mounted on the PCB. Meantime, the PCB may be disposed with a controller in order to control the lens driving device.

Meantime, the PCB may be disposed with a controller to control the lens driving unit (1000).

The image sensor may be mounted on the PCB. The image sensor may be so disposed as to match the lens module (10) in terms of optical axis, through which the image sensor can obtain the light having passed the lens module (10). The image sensor may output the irradiated light as an image. The image sensor may be a CCD (charge coupled device), an MOS (metal oxide semi-conductor), a CPD and a CID, for example. However, the types of image sensor are not limited thereto.

The controller may be mounted on a PCB. Furthermore, the controller may be also disposed at an inside of the lens driving device, for example. The controller may control a direction, intensity and amplitude of a current supplied to each element of lens driving device. The controller may perform any one of an AF function and an OIS function of the camera module by controlling the lens driving device. That is, the controller may move the lens module (10) to an optical axis direction or tile the lens module (10) to a direction orthogonal to the optical axis direction by controlling the lens driving device. Furthermore, the controller may perform a feedback control of AF function and OIS function.

Hereinafter, configuration of lens driving device according to a first exemplary embodiment of the present invention will be described in detail with reference to the accompanying drawings.

FIG. 1 is a cross-sectional view illustrating a lens driving device according to a first exemplary embodiment of the present invention.

Referring to FIG. 1, the lens driving unit (1000) according to a first exemplary embodiment of the present invention may include a first mover (200), a second mover (300), a first housing (410), a second coil (420), a first support member (600) and a second support member (700).

However, the lens driving device according to a first exemplary embodiment of the present invention may be omitted of any one of a first mover (200), a second mover (300), a first housing (410), a second coil (420), a first support member (600) and a second support member (700). Meantime, the lens driving device according to a first exemplary embodiment of the present invention may further include a cover member (not shown), a base (not shown), an AF sensor (not shown) and an OIS sensor (not shown).

The cover member may form an exterior look of lens driving device. The cover member may take a bottom-opened cubic shape. However, the present invention is not limited thereto. The cover member may include an upper surface and a lateral surface extended downwards from an external side of the upper surface. Meantime, the cover member may be mounted at an upper surface of a base. An inner space formed by the cover member and the base may be disposed with a first mover (200), a second mover (300), a first housing (410), a second coil (420), a first support member (600) and a second support member (700).

Furthermore, the cover member may be mounted to the base by partially or totally adhered by an inner lateral surface to a lateral surface of the base, through which the cover member may have functions of protecting inner elements from external shocks and preventing foreign objects from entering the cover member as well.

The cover member may be formed with a metal material, for example. To be more specific, the cover member may be equipped with a metal plate. In this case, the cover member may prevent radio interference. That is, the cover member may prevent electric waves generated from outside of the lens driving device from entering an inside of the cover member. Furthermore, the cover member may prevent the electric waves generated from inside of the cover member from being emitted to outside of the cover member. However, the material of cover member according to the present invention is not limited thereto.

The cover member may include an opening (not shown) exposing the lens module (10) by being formed at an upper surface. The opening may be formed in a shape corresponding to that of the lens module (10). The size of opening may be formed greater than that of a diameter of the lens module (10) in order to allow the lens module (10) to be assembled through the opening. Furthermore, a light introduced through the opening may pass through the lens module (10). Meantime, the light having passed the lens module (10) may be transmitted to the image sensor.

The first mover (200) may include a bobbin (210) and a first coil (220). The first mover (200) may be coupled to a lens module (10), one of the constitutional elements of camera module {however, the lens module (10) may be explained as one of the elements of the lens driving device}. That is, the lens module (10) may be disposed at an inside of the first mover (200). In other words, an inner peripheral surface of the first mover (200) may be coupled by an outer peripheral surface of the lens module (10). Meantime, the first mover (200) may move integrally with the lens module (10) through an interaction with the second mover (300). That is, the first mover (200) may move the lens module (10).

The first mover (200) may include a bobbin (210). Furthermore, the first mover (200) may include a first coil (220) coupled to the bobbin (210).

The bobbin (210) may be coupled to the lens module (10). The bobbin (210) may accommodate the lens module (10) at an inside thereof. To be more specific, an inner peripheral surface of the bobbin (210) may be coupled by an outer peripheral surface of the lens module (10). Meanwhile, the bobbin (210) may be coupled by the first coil (220). Furthermore, a bottom surface of bobbin (210) may be coupled to a first bottom support member (620) and an upper surface of the bobbin (210) may be coupled to an upper surface of an upper support member (610). The bobbin (210) may be disposed at an inside of a second housing (310). The bobbin (210) may be moved to an optical axis direction relative to the second housing (310).

The bobbin (210) may include a lens coupling portion (211) formed thereinside. The lens coupling portion (211) may be coupled by the lens module (10). An inner peripheral surface of the lens coupling portion (211) may formed with a screw thread in a shape corresponding to that of a screw thread formed at an outer peripheral surface of the lens module (10). That is, the outer peripheral surface of lens module (10) may be screw-connected to the inner peripheral surface of the lens coupling portion (211). Meantime, the outer peripheral surface of lens module (10) may be coupled by an adhesive to the inner peripheral surface of the lens coupling portion (211). At this time, the adhesive may be UV hardening epoxy.

The bobbin (210) may include a coil accommodation groove wound by or installed with the first coil (220). The coil accommodation groove may be integrally formed with an external lateral surface of the bobbin (210). Furthermore, the coil accommodation groove may be continuously formed along with the external lateral surface of the bobbin (210) or may be spaced apart at a predetermined distance. The coil accommodation groove may be formed by a portion of the external lateral surface of the bobbin (210) being recessed. The coil accommodation groove may be disposed with the first coil (220), and the first coil (220) disposed at the coil accommodation groove may be supported by the external lateral surface of the bobbin (210) forming the coil accommodation groove. The first coil (220) may be disposed at the coil accommodation groove formed by the external lateral surface of bobbin (210) being recessed inwardly. At this time, the external lateral surface of first coil (220) and the external lateral surface of the bobbin (210) may form a planar surface.

The bobbin (210) may include an upper coupling portion (213) coupled with the first upper support member (610).

The upper coupling portion (213) may be coupled to an inner lateral portion (612) of the first upper support member (610). For example, a lug (not shown) of the upper coupling portion (213) may be coupled by being inserted into a groove or a hole (not shown) at the inner lateral portion (612). Meantime, these elements may be coupled by allowing a lug to be disposed at the first upper support member (610) and by allowing a groove or a hole to be disposed at the bobbin (210). Meantime, the bobbin (210) may include a bottom coupling portion (214) coupled to a first bottom support member (620). The bottom coupling portion (214) formed at a bottom of the bobbin (210) may be coupled to an inner lateral portion (622) of the first bottom support member (620). For example, a lug (not shown) at the first bottom coupling portion (214) may be coupled by being inserted into a groove or a hole (not shown) of the inner lateral portion (622). Meanwhile, these elements may be coupled by allowing a lug to be disposed at the first bottom support member (620) and by allowing a groove or a hole to be disposed on the bobbin (210).

The first coil (220) may be disposed in opposition to a magnet (320) of the second mover (300). The first coil (220) may move the bobbin (210) relative to the housing (310) through an electromagnetic interaction with the magnet (320). The first coil (220) may be guided to the coil accommodation groove (212) to be wound on an external lateral surface of the bobbin (210). Furthermore, in another exemplary embodiment, the first coil (220) may be at the external lateral surface of the bobbin (210) by allowing four coils to be independently disposed to form a 90° between adjacent two coils. An electric power supplied to the first coil (220) may be supplied through the first bottom support member (620). At this time, the first bottom support member (620) may be divisively formed into a pair for power supply to the coil. Furthermore, the electricity supplied to the coil may be supplied through the first upper support member (610). Meanwhile, the first coil (220) may include a pair of lead cables (not shown) for power supply. In this case, each of the pair of lead cables on the first coil (220) may be electrically coupled to each of a pair of first bottom support members (620). Meantime, when electricity is supplied to the coil, an electromagnetic field may be generated about the coil. Furthermore, in a modification, the first coil (220) and the magnet (320) may be arranged by changing each position.

The second mover (300) may be disposed at an external side of the first mover (200) in opposition to the first mover (200). The second mover (300) may be movably supported by the firsts housing (410). The second mover (300) may be disposed at an inside space of the cover member. The second mover (300) may include a second housing (310) disposed at an outside of the bobbin (210). Furthermore, the second mover (300) may include a magnet (320) fixed to the second housing (310) by being disposed in opposition to the first coil (220).

The second housing (310) may be formed with an insulation material, and may be formed in an injection-molded article in consideration of productivity. The second housing (310) is a part moving for OIS function driving, and may be arranged by being spaced apart from the bobbin (210) and the first housing (410) at a predetermined distance.

The second housing (310) may be upper/bottom side-opened to include a first mover (200) in order to allow the first mover (200) to vertically move. The second housing (310) may include, at an inner side, an upper/bottom opened inner space (not shown). That is, the inner space may be formed in a shape corresponding to that of the first mover (200). Furthermore, an inner peripheral surface of the second housing (310) forming the inner space may be disposed by being spaced apart from an outer peripheral surface of the first mover (200).

The second housing (310) may include, at a lateral surface, a magnet coupling portion (312) that accommodates the magnet (320) by being formed in a shape corresponding to that of the magnet (320). The magnet coupling portion (312) may fix the magnet (320) by accommodating the magnet (320). The magnet (320) may be fixed by an adhesive (not shown). Meantime, the magnet coupling portion (312) may be disposed at an inner peripheral surface of the second housing (310). In this case, there is an advantageous strength for an electromagnetic interaction with the first coil (220) disposed at an inside of the second housing (310). Furthermore, the magnet coupling portion (312) may take a bottom-opened shape, for example. In this case, there is an advantageous strength for an electromagnetic interaction between the second coil (420) disposed at a bottom side of the magnet (320) and the magnet (320). The magnet coupling portion (312) may be formed in four pieces, for example. Each of the magnet coupling portion (312) may be coupled by each of the magnet (320).

The second housing (310) may be coupled at an upper surface with a first upper support member (610), and may be coupled at a bottom surface with a first bottom support member (620). The second housing (310) may include an upper side coupling portion (313) coupled to the first upper support member (610). The upper side coupling portion (313) may be coupled to an external portion (611) of the first upper support member (610). For example, a lug (not shown) of the upper side coupling portion (313) may be coupled to a groove or a hole (not shown) at the external portion (611) by being inserted thereinto. Meantime, in another exemplary embodiment, the first upper support member (610) may be formed with a lug, and the second housing (310) may be formed with a groove or a hole, where both elements may be coupled thereby. Meantime, the second housing (310) may include a bottom coupling portion (not shown) coupled to the first bottom support member (620). The bottom coupling portion formed at a bottom surface of the second housing (310) may be coupled to an external portion (not shown) of the first bottom support member (620). For example, a lug of the bottom coupling portion may be coupled by being inserted into a groove or a hole of the external portion.

The second housing (310) may be accommodated at an inside of the first housing (410). The second housing (310) may be elastically supported to the first housing (410) by the second support member (700). The second housing (310) may be tiltably supported relative to the first housing (410).

The magnet (320) may be disposed in opposition to the first coil (220) of the first mover (200). The magnet (320) may move the first coil (220) through an electromagnetic interaction with the first coil (220). The magnet (320) may be fixed to the magnet coupling portion (312) of the second housing (310). The magnet (320) may be disposed at the second housing (310) in such a fashion that four magnets are independently formed, and two adjacent magnets form a right angle of 90°, for example. That is, the magnet (320) can promote an efficient use of inner volume by being installed on four lateral surfaces of the second housing (310), each at a predetermined interval. Furthermore, the magnet (320) may be attached to the second housing (310), but the present invention is not limited thereto. Meantime, the magnet (220) may include four magnet portions, for example. The said each four magnet may be disposed at each four lateral surface of the second housing (310). Furthermore, each of the four magnet portions may be disposed at each four corner of the second housing (310).

The magnet (320) may be fixed to the second housing (310) to allow an entire bottom surface of the magnet (320) to be exposed to the second coil (420). In this case, a more advantageous electromagnetic interaction between the magnet (320) and the second coil (420) can occur over a case where a portion of bottom surface of magnet (320) is covered by the second housing (310). The magnet (320) may be fixed to an inner side of the second housing (310) and at least a portion of the magnet (320) may be further protruded downwards than the second housing (310). In this case, an entire bottom surface of the magnet (320) may be exposed to the second coil (420).

The first housing (410) may be disposed at an outside of the second housing (310). The first housing (410) may accommodate the second housing (310) at an inside thereof. The first housing (410) may be fixed to an inner lateral surface of the second housing (310), for example. Meantime, the first housing (410) may be fixed by a base, for example. The first housing (410) may be connected to the second housing (310) through the second support member (700). The first housing (410) may be elastically coupled to the second housing (310) through the second support member (700).

When an electricity is applied to the second coil (420), the magnet (320) and the second housing (310) fixed by the magnet (320) may be integrally moved through interaction with the magnet (320). The second coil (420) may be mounted on a circuit substrate or may be electrically connected to the circuit substrate. Meantime, the second coil (420) may be formed with a through hole for a light of the lens module (10) to pass by. Furthermore, the second coil (420) may be formed with an FP (Fine Patterned) coil in consideration of miniaturization of the lens driving device (to reduce a height to a z axis direction which is an optical axis direction). At this time, the circuit substrate may include a flexible circuit substrate of FPCB (Flexible Printed Circuit Board). The circuit substrate may be interposed between the second coil (420) and the base. Meantime, the circuit substrate can supply an electric power to the second coil (420). The circuit substrate may be formed with a through hole for a light of the lens module (10) to pass by. Furthermore, the circuit substrate may include a terminal portion that is bent and exposed to outside. The terminal portion may be connected to an outside power through which electricity can be supplied to the circuit substrate.

The second coil (420) may be so disposed as to be spaced apart downward from the magnet (320). That is, the second coil (420) may be disposed by being spaced apart from the first housing (410). When the second coil (420) is disposed at the first housing (410), a plurality of elements may be required to supply a power to the second coil (420), but when the second coil (420) is disposed at a bottom side of the magnet (320), the second coil (420) may be directly mounted on the circuit substrate to enable to receive the power. The second coil (420) may be disposed at the base. However, a circuit substrate may be interposed between the second coil (420) and the base. The second coil (420) may be formed with an FP coil to be disposed at an upper surface of the base while being mounted on the circuit substrate.

The second coil (420) may include a first coil portion (421) opposite to a first magnet portion (321) of the magnet (320) and a second coil portion (422) opposite to a second magnet portion (322) of the magnet (320). At this time, the directions of currents applied to the first coil portion (421) and the second coil portion (422) may be separately controlled. That is, the directions of currents applied to the first coil portion (421) and the second coil portion (422) may be mutually corresponded, or may be mutually opposite. Through the control of current directions, the magnet (320) may be tilted relative to the second coil (420) {see FIG. 2(B)}.

The base may be disposed at bottom sides of bobbin (210), the second housing (310) and the first housing (410). For example, the base may support the first housing (410) from a bottom side. The bottom side of the base may be disposed with a PCB. The base may include a through hole formed at a position corresponding to that of a lens coupling portion (211) of the bobbin (210). The base may perform a function of sensor holder protecting an image sensor. Meantime, the base may be disposed with an Infrared ray filter. Furthermore, the through hole of the base may be coupled by the infrared ray filter.

The base may include a foreign object collection portion collecting foreign objects introduced into the cover member, for example. The foreign object collection portion may be disposed at an upper surface of the base, and include an adhesive material to collect foreign objects at an inside space formed by the cover member and the base. The base may include a sensor mounting portion coupled by an OIS sensor. That is, the OIS sensor may be mounted on the sensor mounting portion. At this time, the OIS sensor may detect the magnet (320) coupled to the second housing (310) to detect a movement of the second housing (310). The sensor mounting portion may be disposed with two pieces, for example. Each of the two sensor mounting portions may be disposed with the OIS sensor. In this case, the OIS sensor may be so disposed as to detect all the movements of x axis and y axis at the second housing (310).

The first support member (600) may connect the first mover (200) and the second mover (300). The first support member (600) may elastically connect the first mover (200) and the second mover (300) to enable a relative movement between the first mover (200) and the second mover (300). That is, the first support member (600) may include a first upper support member (610), and a first bottom support member (620).

The first upper support member (610) may include an external portion (611), an internal portion (612) and a connection portion (613), for example. The first upper support member (610) may include an external portion (611) coupled to the second housing (310), an internal portion (612) coupled to the bobbin (210) and a connection portion (613) elastically connecting the external portion (611) and the internal portion (612).

The first upper support member (610) may be connected to an upper surface of the first mover (200) and an upper surface of the second mover (300). To be more specific, the first upper support member (610) may be coupled to an upper surface of the bobbin (210) and an upper surface of the second housing (310). The internal portion (612) of the first upper support member (610) may be coupled to an upper coupling portion (213) of the bobbin (210), and the external portion (611) of the first upper support member (610) may be coupled to an upper coupling portion (313) of the second housing (310).

The first upper support member (610) may be disposed by being divided into six pieces, for example. At this time, two pieces in the six first upper support members (610) may be electrically conducted to the first bottom support member (620) to apply an electric power to the first coil (220). Meantime, the remaining four first upper support members (610) in the six first upper support members (610) may be used to supply an electric power to the AF sensor and to transmit/receive information or signals between a controller and the AF sensor. Furthermore, as a modified example, two first upper support members (610) in the six first upper members (610) may be directly connected to the first coil (220), and the remaining four first upper support members (610) may be connected to the AF sensor.

The first bottom support member (620) may include a pair of first bottom support members, for example. That is, each of the first bottom support member (620) can supply an electric power by being respectively connected to a pair of lead cables of the first coil (220) formed with a coil. Meantime, the pair of first bottom support members (620) may be electrically connected to the circuit substrate. Through this configuration, the pair of first bottom support members (620) may provide an electric power supplied from the circuit substrate to the first coil (220).

The first bottom support member (620) may include an external portion (not shown), an internal portion (622) and a connection portion (623), for example. The first bottom support member (620) may include an external portion coupled to the second housing (310), an internal portion (622) coupled to the bobbin (210) and a connection portion (623) elastically connecting the external portion and the internal portion (622).

The first bottom support member (620) may be connected to a bottom surface of the first mover (200) and a bottom surface of the second mover (300). To be more specific, the first bottom support member (620) may be coupled to a bottom surface of the bobbin (210) and a bottom surface of the second housing (310). The internal portion (622) of the first bottom support member (620) may be coupled to a bottom coupling portion of the bobbin (210), and the external portion of the first bottom support member (620) may be coupled to a bottom coupling portion of the second housing (310).

A second support member (700) may elastically connect the second housing (310) and the first housing (410). The second support member (700) may be disposed at an outside of the first support member (600). That is, the second support member (700) may accommodate the first support member (600) at an inside thereof. At least one portion of the second support member (700) may be formed with an elastic member. Through this configuration, the second support member (700) may movably support the second housing (310) relative to the first housing (600). The second support member (700) may include a second upper support member (710) and a second bottom support member (720).

The second upper support member (710) may include an external portion (711), an internal portion (712) and a connection portion (713), for example. The second upper support member (710) may include an external portion (711) coupled to the first housing (410), an internal portion (712) coupled to the second housing (310) and a connection portion (713) elastically connecting the external portion (711) and the internal portion (712).

The second upper support member (710) may be coupled to an upper surface of the second housing (310) and an upper surface of the first housing (410). The internal portion (712) of the second upper support member (710) may be coupled to an upper coupling portion (not shown) of the second housing (310), and the external portion (711) of the second upper support member (710) may be coupled to an upper coupling portion (not shown) of the first housing (410).

The second upper support member (710) may be used in order to supply an electric power to at least one of a first coil (220) and a second coil (420), for example. In this case, the second upper support member (710) may be formed by being divided into a plurality of pieces.

The second bottom support member (720) may include an external portion (721), an internal portion (722) and a connection portion (723), for example. The first bottom support member (720) may include an external portion (721) coupled to the first housing (410), an internal portion (722) coupled to the second housing (310) and a connection portion (723) elastically connecting the external portion (721) and the internal portion (722).

The second bottom support member (720) may be coupled to a bottom surface of the second housing (310) and a bottom surface of the first housing (410). The internal portion (722) of the second bottom support member (720) may be coupled to a bottom coupling portion (not shown) of the second housing (310), and the external portion (721) of the second bottom support member (720) may be coupled to a bottom coupling portion of the first housing (410).

The second bottom support member (720) may be used in order to supply an electric power to at least one of a first coil (220) and a second coil (420), for example. In this case, the second bottom support member (720) may be formed by being divided into a plurality of pieces.

The AF sensor may be used for AF feedback function. The AF sensor may detect a position or a movement of any one of the first mover (200) and the second mover (300). For example, the AF sensor may be disposed at the second housing (310) to provide information for AF feedback by detecting a position or movement of the first coil (220). In another example, the AF sensor may be disposed at the bobbin (210) to provide information for AF feedback by detecting a position or movement of the magnet (320). The AF sensor may be disposed by being mounted at the FPCB (Flexible Printed Circuit Board), where the FPCB may be electrically conducted with the first upper support member (610). However, the position of the AF sensor may not be limited thereto.

The OIS sensor may be used for OIS feedback. The OIS sensor may detect at least one of the position and movement of the first mover (200) and the second mover (300). The OIS sensor may provide information for OIS feedback by detecting a horizontal movement or horizontal tilt of the second mover (300).

The OIS sensor may be disposed at the base. The OIS sensor may be disposed at an upper surface or a bottom surface of circuit substrate mounted with the second coil (420). The OIS sensor may be disposed at a sensor mounting portion formed at the base by being arranged at a bottom surface of the circuit substrate, for example. The OIS sensor may include a Hall sensor, for example. In this case, the OIS sensor may sense a relative movement of the second mover (300) relative to the second coil (420) by sensing a magnetic field of the magnet (320) of the second mover (300). The OIS sensor may detect all the x axis and y axis movements of the second mover (300) by being formed in more than two pieces.

Now, the operation of camera module according to a first exemplary embodiment of the present invention will be described with reference to the accompanying drawings.

Figure 2:
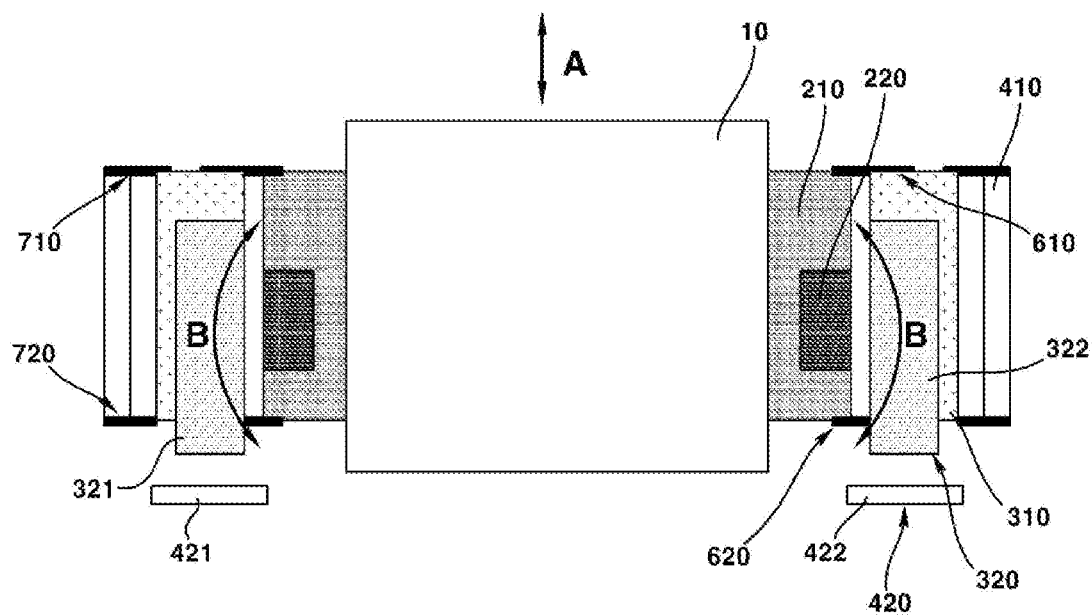
FIG. 2 is a cross-sectional view illustrating a lens driving device according to a first exemplary embodiment of the present invention.

FIG. 2 is a cross-sectional view illustrating a lens driving device according to a first exemplary embodiment of the present invention.

First, the AF function of camera module according to a first exemplary embodiment of the present invention will be described.

When a power is supplied to the first coil (220) formed with a coil, the first coil (220) may perform a movement relative to the magnet (320) through an electromagnetic interaction between the magnet (320) formed with a magnet and the first coil (220). At this time, the bobbin (210) coupled by the first coil (220) may move integrally with the first coil (220). That is, the bobbin (210) coupled by the lens module (10) at an inside may vertically move or move to an optical axis direction relative to the second housing (310) {see FIG. 2A}. This movement by the bobbin (210) may result in the lens module (10) moving closer to or distanced from an image sensor, whereby a focus adjustment relative to an object can be implemented.

Meantime, an AF feedback may be applied for more accurate implementation of AF function of camera module according to a first exemplary embodiment of the present invention. To be more specific, the AF sensor may be formed at the bobbin (210) in order to detect a magnetic field of the magnet (320). Meantime, when the bobbin (210) performs a relative movement relative to the second housing (310), the amount of magnetic field detected by the AF sensor is changed. Using the abovementioned method, the AF sensor may transmit a detection value to a controller by detecting the movement of z axis direction or a position of the bobbin (210). The controller may determine whether to perform an additional movement to the bobbin (210) through the received detection value. This process is performed in real time, such that the AF function of the camera module according to an exemplary embodiment of the present invention can be more accurately implemented through the AF feedback.

Now, the OIS function of camera module according to a first exemplary embodiment of the present invention will be described.

When a power is supplied to the second coil (420) formed with a coil, the magnet (320) may perform a movement relative to the second coil (420) through an electromagnetic interaction between the magnet (320) formed with a magnet and the second coil (420). At this time, the second housing (310) coupled by the magnet (320) may move integrally with the magnet (320). That is, the second housing (310) may move to the second housing (310). At this time, because a current direction is differently provided to a first coil portion (421) of the second coil (420) and to a second coil portion (422) positioned opposite to the first coil portion (421), the second housing (310) can be tilted to the second coil (420) {see FIG. 2B}. In this case, the bobbin (210) connected with the second housing (310) can be tilted against the second coil (420). This movement by the bobbin (210) may result in the lens module (10) being tilted an image sensor, whereby an OIS function can be implemented.

Meantime, an OIS feedback may be applied for more accurate implementation of OIS function of camera module according to a first exemplary embodiment of the present invention.

A pair of OIS sensors formed with a Hall sensor by being mounted on the base may detect a magnetic field of a magnet at the magnet (320) fixed to the second housing (310). Meanwhile, when the magnet (320) performs a relative movement relative to the second coil (420), the amount of magnetic field detected by the OIS sensor is changed. Using the abovementioned method, the pair of OIS sensors may transmit a detection value to a controller by detecting the movement of horizontal direction (x axis and y axis directions) or a position of the magnet (320). The controller may determine whether to perform an additional movement to the magnet (320) through the received detection value. This process is performed in real time, such that the OIS function of the camera module according to an exemplary embodiment of the present invention can be more accurately implemented through the OIS feedback.

Hereinafter, configuration of optical device according to a second exemplary embodiment of the present invention will be described.

The optical device according to a second exemplary embodiment of the present invention may be a hand phone, a mobile phone, a smart phone, a portable smart device, a digital camera, a notebook computer (laptop computer), a PMP (Portable Multimedia Player) and a navigation device. However, the present invention is not limited thereto, and may include any device capable of photographing an image or a photograph.

The optical device according to a second exemplary embodiment of the present invention may include a main body (not shown), a display portion (not shown) arranged at one surface of the main body to display information, and a camera having a camera module (not shown) disposed at the main body to photograph an image or a photograph.

Hereinafter, configuration of camera module according to a second exemplary embodiment of the present invention will be described.

Figure 3:
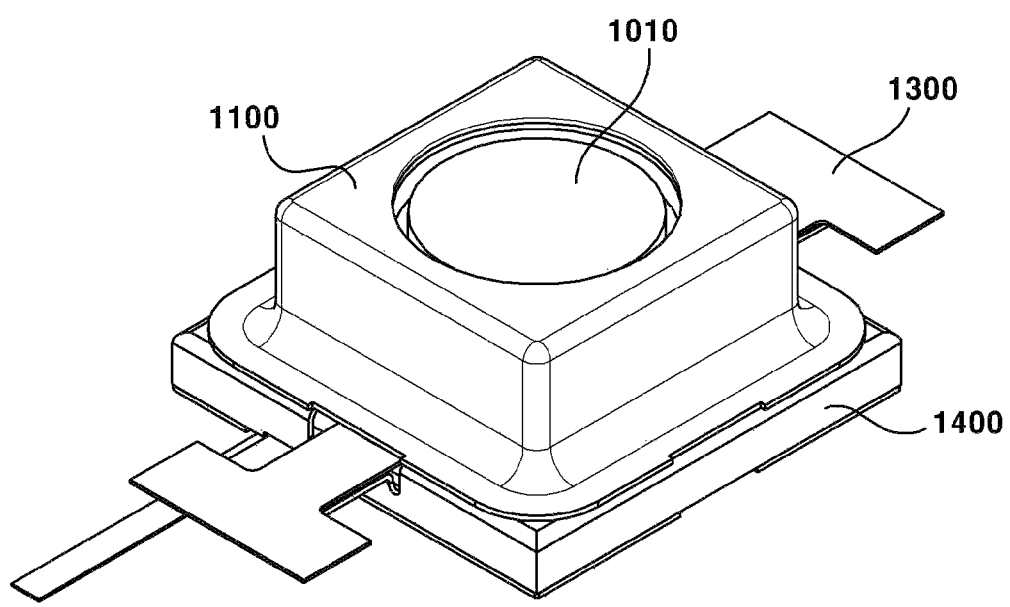
FIG. 3 is a perspective view illustrating a camera module according to a second exemplary embodiment of the present invention.
Figure 4:
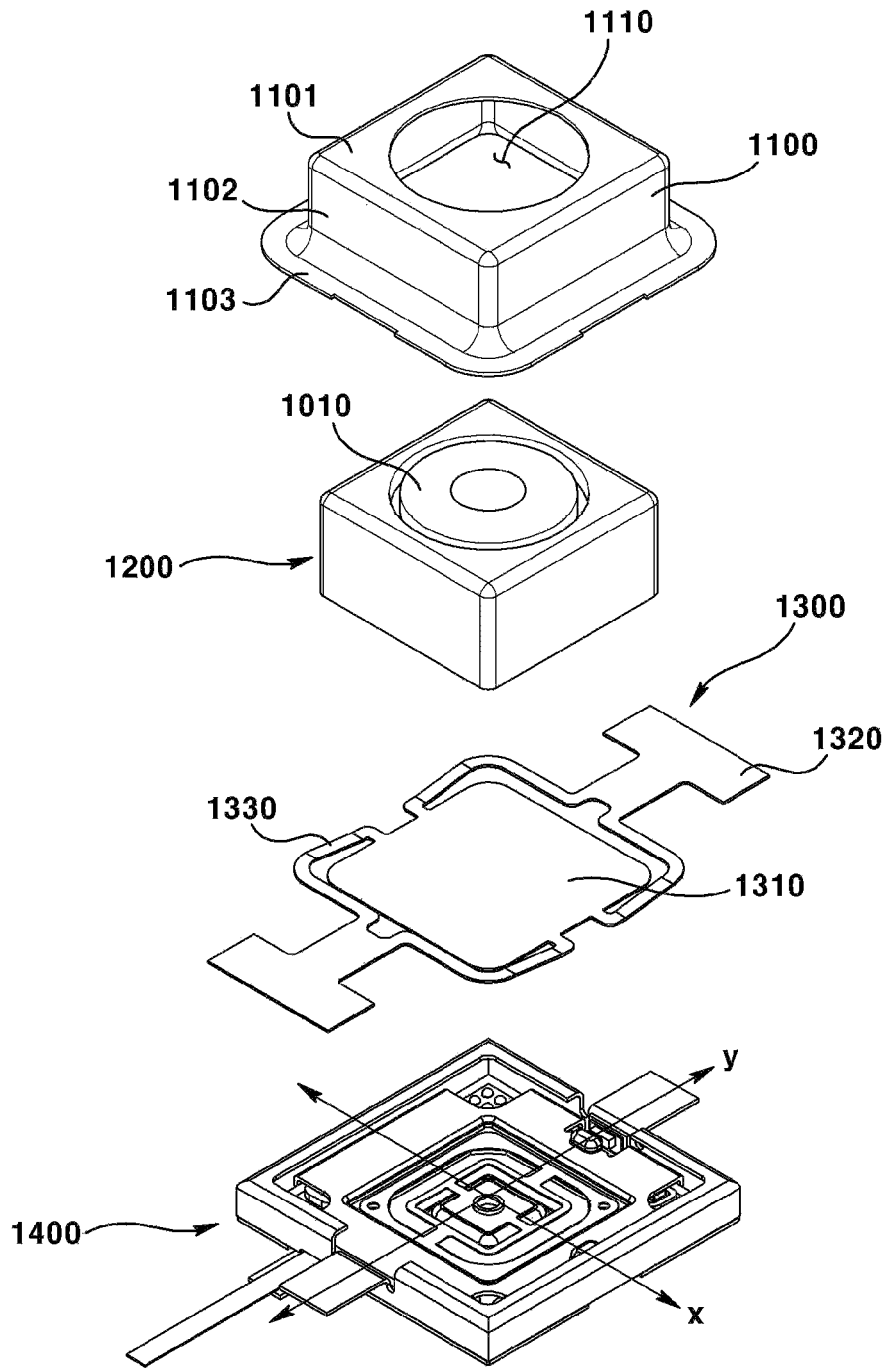
FIG. 4 is an exploded perspective view illustrating a camera module according to a second exemplary embodiment of the present invention.
Figure 5:
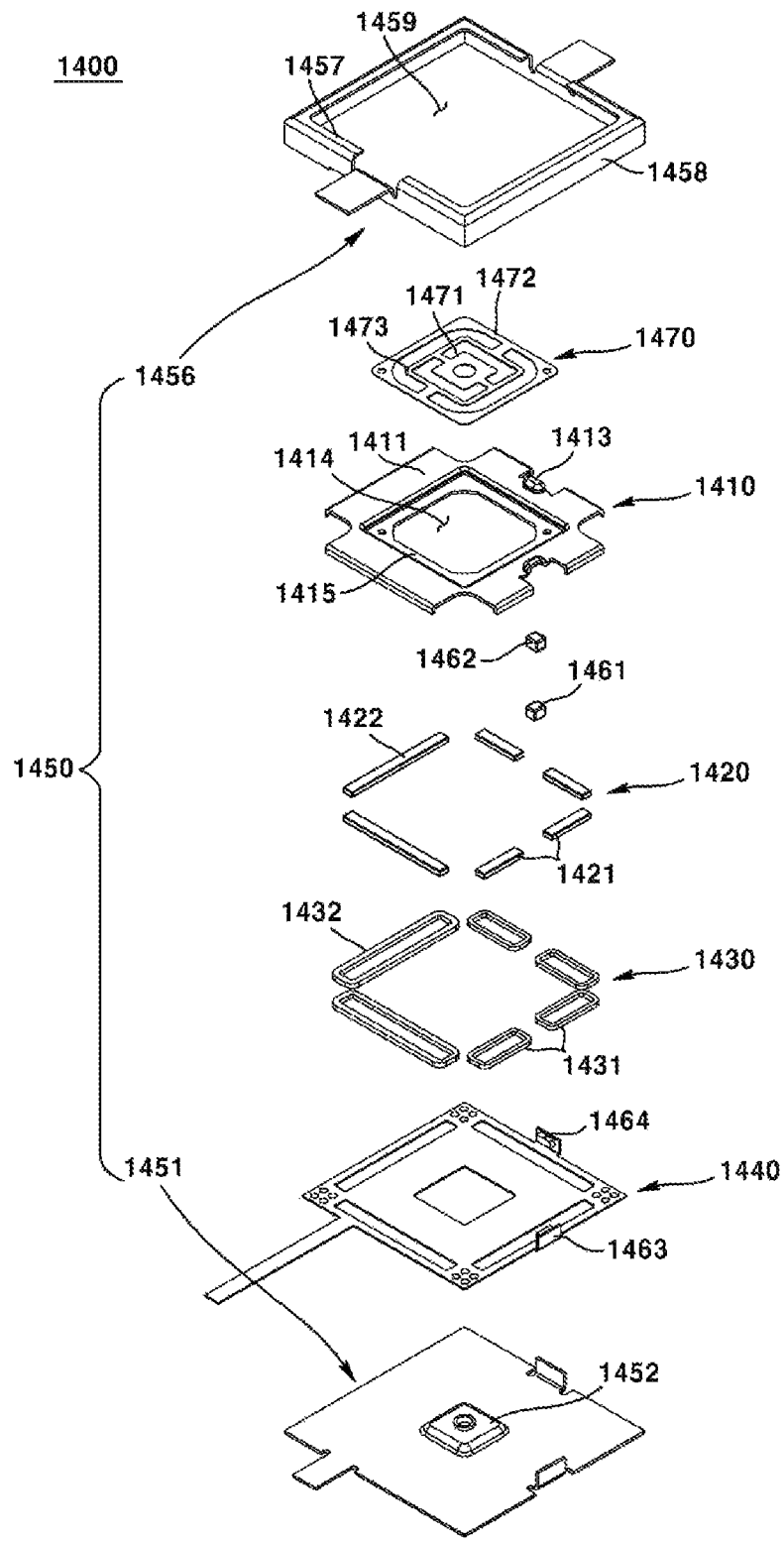
FIG. 5 is an exploded perspective view illustrating an OIS actuator according to a second exemplary embodiment of the present invention.
Figure 6:
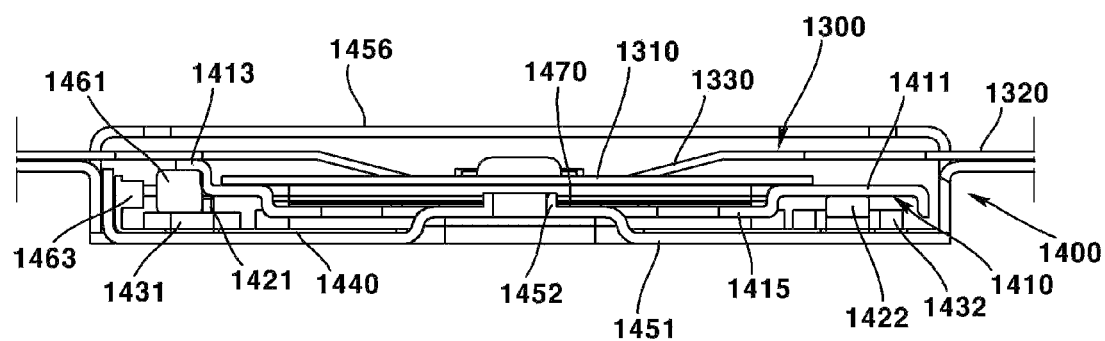
FIG. 6 is a cross-sectional view illustrating a coupled state between a first substrate of a camera module and an OIS actuator according to a second exemplary embodiment of the present invention.

FIG. 3 is a perspective view illustrating a camera module according to a second exemplary embodiment of the present invention, FIG. 4 is an exploded perspective view illustrating a camera module according to a second exemplary embodiment of the present invention, FIG. 5 is an exploded perspective view illustrating an OIS actuator according to a second exemplary embodiment of the present invention, and FIG. 6 is a cross-sectional view illustrating a coupled state between a first substrate of a camera module and an OIS actuator according to a second exemplary embodiment of the present invention.

Referring to FIGS. 3 to 6, the camera module according to a second exemplary embodiment of the present invention may include a module driving unit (not shown) and a camera module.

Furthermore, the camera module may include a lens module (1010), an infrared cut-off filter (not shown), an image sensor (not shown) and a controller (not shown), and at least any one element can be omitted. Furthermore, the camera module may further include a lens driving unit and may perform an AF function.

The lens module (1010) may include one or more lenses (not shown) and a lens barrel accommodating one or more lenses. However, one element of the lens module (1010) is not limited by the lens barrel, and any holder structure capable of supporting one or more lenses will suffice. The lens module (1010) may be screw-coupled with a module driving device, for example. Meantime, a light having passed the lens module (1010) may be irradiated on the image sensor.

The camera module may be coupled to a module driving unit to integrally move with the module driving unit. The camera module may be coupled to an inside of the module driving unit, for example. The lens module (1010) may be coupled to an inside of the module driving unit.

The infrared cut-off filter may serve to prevent a light of infrared ray region from entering the image sensor. The infrared cut-off filter may be interposed between the lens module (1010) and the image sensor, for example. The infrared cut-off filter may be formed with a film material or a glass material, for example. Meantime, the infrared cut-off filter may be formed by allowing an infrared cut-off coating material to be coated on a plate-shaped optical filter such as an imaging plane protection cover glass or a cover glass, for example.

The image sensor may be mounted on a PCB (not shown). Alternatively, the image sensor may be mounted on a first substrate (1300). The image sensor may be so disposed as to match the lens module (1010) in terms of optical axis, through which the image sensor can obtain the light having passed the lens module (1010). The image sensor may output the irradiated light as an image. The image sensor may be a CCD (charge coupled device), an MOS (metal oxide semi-conductor), a CPD and a CID, for example. However, the types of image sensor are not limited thereto.

The controller may be mounted on a sensor substrate, a first substrate (1300) or a PCB formed outside of the camera module. Furthermore, the controller may be also disposed at an inside or an outside of module driving unit. The controller may control a direction, intensity and amplitude of a current supplied to each element of module driving unit. The controller may perform any one of an AF function and an OIS function of the camera module by controlling the module driving unit. That is, the controller may move the lens module (1010) to an optical axis direction or tile the lens module (1010) to a direction orthogonal to the optical axis direction by controlling the module driving unit. Furthermore, the controller may perform a feedback control of AF function and OIS function. To be more specific, the controller may control a power or a current applied to a fourth driving portion (1430) by receiving a position of a third driving portion (1420) detected by a sensor portion (1460).

Hereinafter, configuration of module driving unit according to a second exemplary embodiment of the present invention will be described in detail with reference to the accompanying drawings.

The module driving unit according to a second exemplary embodiment of the present invention may include a first substrate (1300) and an OIS actuator (1400). However, the module driving unit according to a second exemplary embodiment of the present invention may further include a cover member (1100).

The cover member (1100) may form an exterior look of module driving unit or a camera module. The cover member (1100) may take a bottom-opened cubic shape. However, the present invention is not limited thereto. For example, the cover member (1100) may be extended to an external side towards a bottom side. the cover member (1100) may include an upper plate (1101), a lateral plate (1102) extended from the upper plate (1101) and an inner space formed at an inside of the upper plate (1101) and the lateral plate (1102). A camera module (1200) may be disposed at an inner space of the cover member (1100). Meantime, a bottom end of the lateral plate (1102) at the cover member (1100) may be coupled by an OIS actuator (1400). To be more specific, an extension portion (1103) disposed at a bottom end of the lateral plate (1102) at the cover member (1100) may be coupled by an upper case (1456) of the OIS actuator (1400). Through this structure, the cover member (1100) may have functions of protecting inner elements from external shocks and preventing foreign objects from entering the cover member (1100) as well.

The cover member (1100) may be formed with a metal material, for example. To be more specific, the cover member (1100) may be equipped with a metal plate. In this case, the cover member (1100) may prevent radio interference. That is, the cover member (1100) may prevent electric waves generated from outside of the module driving unit from entering an inside of the cover member (1100). Furthermore, the cover member (1100) may prevent the electric waves generated from inside of the cover member (1100) from being emitted to outside of the cover member (1100). However, the material of cover member (1100) according to the present invention is not limited thereto.

The cover member (1100) may include an opening (1110)) exposing the lens module (1010) by being formed at the upper plate (1101). The opening (1110) may be formed in a shape corresponding to that of the lens module (1010). The size of opening (1110) may be formed greater than that of a diameter of the lens module (1010) in order to allow the lens module (1010) to be assembled through the opening (1110). Furthermore, a light introduced through the opening (1110) may pass through the lens module (1010). Meantime, the light having passed the lens module (1010) may be transmitted to an image sensor.

The cover member (1100) may include an extension portion (1103) formed at a bottom surface of the lateral plate (1102). At least one portion of the lateral plate (1102) of the cover member (1100) may be extended outwardly. That is, at least one portion of the lateral plate (1102) at the cover member (1100) may be formed with an extension portion (103) extended to an outside toward a bottom side. A bottom surface of the extension portion (1103) may be coupled to an upper plate (1457) of an upper case (1456) of the OIS actuator (1400).

The camera module (1200) may include a lens driving unit for focus adjusting function of the lens module (1010) by accommodating the lens module (1010). The camera module (1200) may move the lens module (1010) to an optical axis direction, for example. The lens driving unit may include a bobbin (not shown), a first driving portion (not shown), a housing (not shown), a second driving portion (not shown) and a support member (not shown), for example. To be more specific, the lens driving unit may include a bobbin accommodated at an inside of the lens module (1010), a first driving portion disposed at the bobbin, a housing disposed at an outside of the bobbin, a second driving portion disposed at the housing to move the first driving portion through an electromagnetic interaction, an upper support member and a bottom support member coupled to the bobbin and the housing to elastically support the bobbin relative to the housing. At this time, the first driving portion may include a coil and the second driving portion may include a magnet. Alternatively, the first driving portion may include a magnet and the second driving portion may include a coil. However, any one of the bobbin, the first driving portion, the housing, the second driving portion and the support member may be omitted from the lens driving unit. Furthermore, the configuration of the camera module (1200) is not limited thereto, and any structure capable of performing a focus adjusting function of the lens module (1010) may suffice.

The first substrate (1300) may be mounted at an upper surface with an image sensor. An upper surface of the first substrate (1300) may be coupled to a bottom surface of the camera module (1200). The first substrate (1300), through this structure, may integrally move the camera module (1200) and the image sensor while an optical axis of the camera module (1200) and that of the image sensor are in a matching consistent state.

The first substrate (1300) may include a body portion (1310), a terminal portion (1320) and a connection portion (1330). To be more specific, the first substrate (1300) may include a body portion (1310) coupled to a bottom surface of the camera module (1200). The first substrate (1300) may include a terminal portion (1320) connected to an outside device by being disposed at an outside of the body portion (1310). The first substrate (1300) may include a connection portion (1330) connecting the body portion (1310) and the terminal portion (1320). The first substrate (1300) may include a body portion (1310), a terminal portion (1320) and a connection portion (1330).

The body portion (1310) may be mounted with an image sensor. The body portion (1310) may be coupled to a bottom surface of the camera module (1200). The body portion (1310) may take a shape corresponding to that of a bottom surface of the camera module (1200), for example. The body portion (1310) may integrally move the camera module (1200) and the image sensor.

The terminal portion (1320) may be connected to an outside device by being disposed at an outside of the body portion (1310). Here, the outside device may be an element of optical device such as an optical device PCB. The terminal portion (1320) may be extended to an outside from the connection portion (1330). The terminal portion (1320) may supply a power to the image sensor and the camera module (1200) by being connected to the outside device.

The connection portion (1330) may connect the body portion (1310) and the terminal portion (1320). The connection portion (1330) may elastically support the body portion (1310) relative to the terminal portion (1320). That is, the connection portion (1330) may hold elasticity. For example, the connection portion (1330) may be formed with an FPCB. Alternatively, the whole area of the first substrate (1300) may be formed with an FPCB. That is, at least a portion of the first substrate (1300) may be formed with an FPCB. The terminal portion (1320) may allow the body portion (1310) to move while the terminal portion (1320) is fixed through the flexible connection portion (1330).

The OIS actuator (1400) may support the first substrate (1300) from a bottom side. The OIS actuator (1400) may selectively move the first substrate (1300). The OIS actuator (1400) may tilt the first substrate (1300). The OIS actuator (1400) may also tilt the camera module (1200) integrally moving with the first substrate (1300) by tilting the first substrate (1300), whereby the OIS actuator (1400) can perform the OIS function of the camera module according to the second exemplary embodiment of the present invention. Because a module tilt method is used instead of lens shifting method in the camera module according to the second exemplary embodiment of the present invention, an image distortion phenomenon can be minimized that is generated from an outside of a handshake corrected image generated in the lens shifting method.

The OIS actuator (1400) may include a plate (1410), a third driving portion (1420), a fourth driving portion (1430), a second substrate (1440), a case (1450), a sensor portion (1460) and a support member (1470). However, at least any one of the plate (1410), the third driving portion (1420), the fourth driving portion (1430), the second substrate (1440), the case (1450), the sensor portion (1460) and the support member (1470) may be omitted from the OIS actuator (1400).

The plate (1410) may support a bottom surface of the first substrate (1300). The plate (1410) may be coupled to a bottom surface of the first substrate (1300). The plate (1410) may integrally move with the first substrate (1300). The plate (1410) may integrally move with the first substrate (1300), the image sensor and the camera module (1200). The plate (1410) may be moved by electromagnetic interaction with the third driving portion (1420) and the fourth driving portion (1430). The plate (1410) may be disposed at an inner space formed by a bottom case (1451) and an upper case (1456). At this time, at least a portion of the plate (1410) may be vertically overlapped with the upper case (1456). That is, a moving limit of the plate (1410) may be determined by the upper case (1456). That is, the upper case may function as an upper stopper of the plate (1410).

A bottom surface of the plate (1410) may be disposed with a sensing magnet (1461, 1462) and a third driving portion (1420). The plate (1410) may include a first lateral portion disposed with the sensing magnet (1461, 1462) and a second lateral portion opposite to the first lateral portion that is not disposed with the sensing magnet (1461, 1462). At this time, the first driving magnet (1421) disposed at the first lateral portion and the second driving magnet (1422) disposed at the second lateral portion may be asymmetrical. The first driving magnet (1421) may be formed in a shape different from that of the second driving magnet (1422) in order to minimize interference with the sensing magnet (1461, 1462).

The plate (1410) may include a sensing magnet accommodation portion (1413) accommodating the sensing magnet (1461, 1462). At least a portion of the sensing magnet accommodation portion (1413) may have a shape corresponding to that of the sensing magnet (1461, 1462). The sensing magnet (1461, 1462) may be adhered and fixed to the sensing magnet accommodation portion (1413) by an adhesive.

At least a portion of upper surface of the plate (1410) may disposed with a staircase portion (1415) formed downwardly in a stair-cased manner. The staircase portion (1415) may be formed in a stair-cased manner downwardly on at least one portion of the upper surface at the plate (1410). The staircase portion (1415) may have a size corresponding to that of the support member (1470). The staircase portion (1415) may be disposed at an inside with a hollow hole (1414). An outside of the support member (1470) may be coupled to the staircase portion (1415) of the plate (1410), and an inside of the support member (1470) may be coupled to a lug (1452) of the bottom case (1451) through the hollow hole (1414), whereby the plate (1410) can be movably supported relative to the bottom case (1451).

The third driving portion (1420) may be disposed at the plate (1410). To be more specific, the third driving portion (1420) may be adhered and fixed to the bottom surface of the plate by an adhesive. The third driving portion (1420) may include a magnet, for example. The third driving portion (1420) may include a first driving magnet (1421) disposed at first lateral portion disposed with the sensing magnet (1461, 1462) on the plate (1410), and a second driving magnet (1422) disposed at a second lateral portion opposite to the first lateral portion that is not disposed with the sensing magnet (1461, 1462). The first driving magnet (1421) may be formed in a plural number. At this time, the first sensing magnet (1461) may be disposed among or between a plurality of first driving magnets (1421), whereby interference between the first driving magnet (1421) and the sensing magnet (1461, 1462) can be minimized. Meantime, the description of an arranged structure between the first sensing magnet (1461) and the first driving magnet (1421) may be applied to that between the neighboring sensing magnet (1462) and the driving magnet.

The fourth driving portion (1430) may move the third driving portion (1420) through electromagnetic interaction. The fourth driving portion (1430) may be disposed at the second substrate (1440), for example. The fourth driving portion (1430) may include a coil. However, the third driving portion (1420) may include a coil and the fourth driving portion (1430) may include a magnet. The fourth driving portion (1430) may be disposed opposite to the third driving portion (1420).

The fourth driving portion (1430) may include a first coil (1431) opposite to the first driving magnet (1421) and a second coil (1432) opposite to the second driving portion (1422). The first coil (1431) and the second coil (1432) may be asymmetrical. The first coil (1431) and the second coil (1432) may be formed in a mutually different shape. The first coil (1431) may be formed in a shape corresponding to that of the first driving magnet (1421) and the second coil (1431) may be formed in a shape corresponding to that of the second driving magnet (1422). The first coil (1431) may be so disposed as not to overlap with the sensing magnet (1461, 1462) to a vertical direction. The first coil (1431) may be formed in a plural number, and the sensing magnet (1461, 1462) may be disposed between or among the plurality of first coil (1431).

The second substrate (1440) may be disposed with the fourth driving portion (1430). The second substrate (1440) may supply a power to a coil of the fourth driving portion (1430). The second substrate (1440) may be disposed with the Hall sensor (1463, 1464). The second substrate (1440) may supply a power to the Hall sensor (1463, 1464). The second substrate (1440) may be disposed at a bottom side of the plate (1410). The second substrate (1440) may be disposed at an inner space formed by the bottom case (1451) and the upper case (1456). The second substrate (1440) may have a corresponding shape to allow being accommodated into the bottom case (1451). A bottom surface of the second substrate (1440) may be supported by an upper surface of the bottom case (1451). The second substrate (1440) may be an FPCB. However, the present invention is not limited thereto. The Hall sensor (1463, 1464) may be disposed at an area where the second substrate (144) is bent upwardly. The second substrate (1440) may be disposed with a hollow hole at an area corresponding to the lug (1452) of the bottom case (1451).

The case (1450) may form an external look of the OIS actuator (1400). The case (1450) may accommodate, at an inner space thereof, a plate (1410), a third driving portion (1420), the fourth driving portion (1430), the second substrate (1440), the sensor portion (1460) and the support member (1470). An upper side of case (1450) may be coupled by the cover member (1100).

The bottom case (1451) may be coupled by the upper case (1456) to form an inner space. The bottom case (1451) may be disposed at a bottom side of the second substrate (1440). The bottom case (1451) may support the second substrate (1440). The bottom case (1451) may include a lug (1452) that is upwardly protruded. The lug (1452) may be disposed at a center of the bottom case (1451) to be upwardly protruded. The lug (1452) may be coupled by an inside lateral portion (1471) of the support member (1470). That is, the bottom case (1451) may movably support the plate (1410) through the support member (1470). The bottom case (1451) may include an upwardly-bent area corresponding to an area bent to an upper side of the second substrate (1440).

The upper case (1456) may be coupled to the bottom case (1451). The upper case (1456) may be coupled to the bottom case (1451) to form an inner space at an inside thereof. The inner space may accommodate the plate (1410), the third driving portion (1420), the fourth driving portion (1430), the second substrate (1440), the sensor portion (1460) and the support member (1470). The upper case (1456) may include an upper plate (1457). The upper plate (1457) of the upper case (1456) may function as an upper stopper of the plate (1410). Meantime, the upper case (1456) may include a lateral plate (1458) downwardly extended from the upper plate (1457). A bottom end f the lateral plate (1458) may be coupled by the bottom case (1451). The upper case (1456) may include an opening disposed with an upper plate (1457). The first substrate (1300) and the camera module (1200) may be accommodated through the opening (1459).

The sensor portion (1460) may detect movement or position of the plate (1410) relative to the second substrate (1440). The sensor portion (1460) may be used in order to perform a feedback of OIS function. The sensor portion (1460) may include a sensing magnet (1461, 1462), a Hall sensor (1463, 1464) detecting the sensing magnet (1461, 1462). The sensor portion (1460) may include a sensing magnet (1461, 1462) disposed at the plate (1410). The sensor portion (1460) may include a Hall sensor (1463, 1464) disposed at the second substrate (1440) to detect the sensing magnet (1461, 1462).

The sensing magnet (1461, 1462) may be disposed at a bottom surface of the plate (1410). The sensing magnet (1461, 1462) may be fixed to the bottom surface of the plate (1410) to integrally move with the plate (1410). The sensing magnet (1461, 1462) may be accommodated at a sensing magnet accommodation portion (1413) of the plate (1410). The sensing magnet (1461, 1462) may be adhered and fixed to the sensing magnet accommodation portion (1413) by an adhesive. The sensing magnet (1461, 1462) may take a cuboid shape, for example. However, the present invention is not limited thereto.

The sensing magnet (1461, 1462) may include a first sensing magnet (1461) disposed on an x axis (see FIG. 5) at a tilt center of the plate (1410). The sensing magnet (1461, 1462) may include a second sensing magnet (1462) disposed on a y axis (see FIG. 5) at a tilt center of the plate (1410), whereby a tilt having an x axis as a center and a tilt having a y axis as a center can be minimized in affecting an output of mutually different axis.

The Hall sensor (1463, 1464) may include a first Hall sensor (1463) opposite to the first sensing magnet (1461). The Hall sensor (1463, 1464) may include a second Hall sensor (1464) opposite to the second sensing magnet (1462). That is, the Hall sensor (1463, 1464) may be disposed at opposite positions in the numbers corresponding to those of the sensing magnets (1461, 1462).

The support member (1470) may elastically connect the plate (1410) and the bottom case (1451). The support member (1470) may be coupled to an upper surface of the plate (1410), and may be coupled to the lug (1452) of the bottom case (1451) through the hollow hole (1414) of the plate (1410). Through this structure, the plate (1410) may be movably supported relative to the bottom case (1451). The support member (1470) may be coupled to the plate (1410) at the staircase (1415). The support member (1470) may include an internal portion (1471), an external portion (1472) and a connection portion (1473). The support member (1470) may include an internal portion (1471) coupled to the lug (1452) of the bottom case (1451). The support member (1470) may include an external portion (1472) coupled to the plate (1410). The support member (1470) may include a connection portion (1473) connecting the internal portion (1471) and the external portion (1472).

The internal portion (1471) may be coupled to the lug (1452) of bottom case (1451). The internal portion (1471) may include a groove or a hole, for example, and the lug (1452) may include a protrusion. In this case, the internal portion (1471) and the lug (1452) may be coupled by a method of the protrusion of the lug (1452) being inserted into the groove or the hole of the internal portion (1471).

The external portion (1472) may be coupled to an upper surface of the plate (1410). The external portion (1472) may be coupled to the staircase portion (1415) of the plate (1410), for example. The external portion (1472) may be coupled to the staircase portion (1415) of the plate (1410), for example.

The connection portion (1473) may elastically connect the internal portion (1471) and the external portion (1472). That is, the connection portion (1473) may have elasticity. At least one portion of the support member (1470) may elasticity. Furthermore, an entire support member (1470) may be formed with an elastic member. The support member (1470) may be a leaf spring, for example. However, the present invention is not limited thereto.

A stator may be formed by allowing the bottom case (1451) and the sensor portion (1460) to be fixed and by allowing an upper surface of the second substrate (1440) to be arranged with a plurality of fourth driving portion (1430). The upper surface of the plate (1410) may be fixed by the external portion (1472) of the support member (1470), and a bottom surface of the plate (1410) may be fixedly arranged at each X/Y tilt center axis by two sensing magnets (1461, 1462) for measuring tilt angles. The reason of arranging the two sensing magnets at tilt center axis is to minimize influences on outputs of mutually different axes during respective X/Y tilt operations. The coil of the fourth driving portion (1430) corresponding to a position where the sensing magnets (1461, 1462) are arranged is divided to two pieces, which is to prevent interference between the sensing magnets (1461, 1462) and the coil of the fourth driving portion (1430) during tilting operation. The bottom surface of the plate (1410) may be fixed by the third driving portion (1420) for tilt operation in addition to the sensing magnets (1461, 1462) and may be arranged at a position opposite to the fourth driving portion (1430) fixed to the stator. The mover formed by the plate (1410), the support member (1470), the sensing magnet (1461, 1462) and the third driving portion (1420) may be fixed to the stator by fixing the internal portion (1471) of the support member (1470) to a central lug (1452) of the stator, and the upper case (1446) for limiting the tilt angle of the plate (1410) may be fixed to the bottom case (1451).

Hereinafter, operations and effects of camera module according to a second exemplary embodiment of the present invention will be described with reference to the accompanying drawings.

First, the AF function of the camera module according to the second exemplary embodiment of the present invention will be described. The AF function may be implemented through the camera module (1200). When a power is supplied to the coil of the first driving portion, the first driving portion is moved by an electromagnetic interaction with the magnet of the second driving portion. At this time, the bobbin coupled by the first driving portion is also integrally moved along with the first driving portion. Furthermore, the lens module (1010) coupled by the bobbin is also integrally moved. That is, the lens module (1010) is moved to an optical axis direction relative to the image sensor. This movement of the lens module (1010) results in the lens module (1010) being closer to or being distanced from the image sensor to allow implementing the focus adjustment to an object. Meantime, when the movement of bobbin in the second exemplary embodiment is sensed in real time, the AF feedback can be also performed.

Now, the OIS function of camera module according to the second exemplary embodiment of the present invention will be described.

When a power is supplied to the coil of the fourth driving portion, the magnet of the third driving portion (1420) is moved by an electromagnetic interaction. At this time, the plate (1410) coupled by the third driving portion (1420) is also integrally moved along with the third driving portion (1420). That is, the plate (1410) is tiltably moved relative to the bottom case (1451), whereby the first substrate (1300) supported by the plate (1410), the image sensor mounted on the first substrate (1300) and the camera module (1200) are all integrally moved. Thus, the image distortion phenomenon generated at an outside (outlying area) of the handshake-corrected image can be minimized in the camera module according to the second exemplary embodiment of the present invention, unlike the OIS function by the lens shift method.

Meantime, an OIS feedback may be applied in order to accomplish a more accurate realization of OIS function in the camera module according to the second exemplary embodiment of the present invention The first Hall sensor (1463) detects a tilt of the plate (1410) about the y axis (see FIG. 5) by sensing the first sensing magnet (1461), and the second Hall sensor (1464) detects a tilt of the plate (1410) about the x axis (see FIG. 5) by sensing the second sensing magnet (1462). The detection value detected by the Hall sensors (1463, 1464) is transmitted to the controller, where the controller determines whether to perform an additional movement relative to the plate (1410) through the received detection value. This process is generated in real time, such that the OIS function of the camera module according to the second exemplary embodiment of the present invention can be more accurately implemented through the OIS feedback.

Although the present disclosure has been explained with all constituent elements forming the exemplary embodiments of the present disclosure being combined in one embodiment, or being operated in one embodiment, the present disclosure is not limited thereto. That is, in some cases, the described features, structures, or operations may be combined in any suitable manner in one or more embodiments. It will also be readily understood that the components of the embodiments, as generally described and illustrated in the figures herein, could be arranged and designed in a wide variety of different configurations.

Terms used in the specification are only provided to illustrate the embodiments and should not be construed as limiting the scope and spirit of the present disclosure. In the specification, a singular form of terms includes plural forms thereof, unless specifically mentioned otherwise. In the term "includes", "including", "comprises" and/or "comprising" as used herein, the mentioned component, step, operation and/or device is not excluded from presence or addition of one or more other components, steps, operations and/or devices.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

The invention claimed is:

1. A lens driving device comprising:
a first housing;
a second housing disposed at an inner side of the first housing;
a bobbin disposed at an inner side of the second housing;
a first coil disposed on the bobbin;
a magnet disposed on the second housing and facing the first coil;
a second coil facing the magnet;
a first elastic member connecting to the bobbin and the second housing; and
a second elastic member connecting to the first housing and the second housing,
wherein the second coil is spaced apart from the first housing,
wherein the magnet comprises a first magnet and a second magnet opposite to the first magnet with respect to an optical axis,
wherein the second coil comprises a first coil portion facing the first magnet and a second coil portion facing the second magnet, and
wherein a first moving direction of the first magnet by an interaction between the first magnet and the first coil portion of the second coil is different from a second moving direction of the second magnet by an interaction between the second magnet and the second coil portion of the second coil.

2. The lens driving device of claim 1, wherein the second coil is disposed under the magnet, and wherein the magnet comprises an inner surface facing the first coil and a lower surface facing the second coil.

3. The lens driving device of claim 2, wherein the magnet is fixed to the second housing in order to allow an entire lower surface of the magnet to be exposed to the second coil.

4. The lens driving device of claim 2, wherein at least a portion of the magnet is more protruded downwards than the second housing.

5. The lens driving device of claim 1, comprising a base disposed under the second housing, the base being spaced apart from the second housing, wherein the second coil is disposed ton the base.

6. The lens driving device of claim 5, comprising a cover member formed with a bottom-opened inner space to be coupled at a lower end with the base, wherein the first housing is disposed at an inner lateral surface of the cover member.

7. The lens driving device of claim 5, wherein the second coil is formed on a substrate with an FP (Fine Pattern) coil.

8. The lens driving device of claim 5, comprising an AF sensor disposed at the first housing or at the base to detect the magnet.

9. The lens driving device of claim 1, wherein the second support elastic member comprises a second upper elastic portion coupled to an upper surface of the first housing and an upper surface of the second housing, and a second lower elastic portion coupled to a lower surface of the first housing and a lower surface of the second housing, and wherein the second upper elastic portion is spaced apart from the second lower elastic portion.

10. The lens driving device of claim 1, wherein the first coil is disposed ton an outer surface of the bobbin, and the magnet is disposed ton an inner surface of the second housing to face the first coil.

11. The lens driving device of claim 1, wherein the first coil is accommodated in a groove formed by being recessed inwardly ton an outer lateral surface of the bobbin, and an outer lateral surface of the first coil and the outer lateral surface of the bobbin are disposed on a same planar surface, and
wherein the first coil is spaced apart from a lower end of the bobbin.

12. The lens driving device of claim 1, wherein the first elastic member movably supports the bobbin, the bobbin coupled to the first elastic member being movable in an optical axis direction relative to the second housing.

13. The lens driving device of claim 12, wherein the first moving direction is opposite to the second moving direction, and
wherein the second elastic member is formed such that the second housing tiltably supports the first housing.

14. The lens driving device of claim 13, wherein the bobbin is integrally tilted with the second housing when the second housing is tilted.

15. The lens driving device of claim 1, wherein a direction of a current applied to the first coil portion is opposite to a direction of a current applied to the second coil portion.

16. The lens driving device of claim 1, wherein the first elastic member comprises a first upper elastic portion coupled to an upper surface of the bobbin and to an upper surface of the second housing, and a first lower elastic portion coupled to a lower surface of bobbin and to a lower surface of the second housing, and
wherein the first upper elastic portion is spaced apart from a first lower elastic portion.

17. The lens driving device of claim 1, comprising an AF sensor disposed at the bobbin to detect the magnet.

18. A camera module, comprising:
a printed circuit board (PCB);
an image sensor disposed on the PCB;
the lens driving device of claim 1 disposed on the PCB;
a lens coupled to the bobbin of the lens driving device.

19. An optical device comprising a main body, the camera module of claim 18 disposed ton the main body to capture an image of an object, and a display portion configured to output the image captured by the camera module.

20. A lens driving device comprising:
a first housing;
a second housing disposed in the first housing;
a bobbin disposed in the second housing;
a first coil disposed on the bobbin;
a magnet disposed on the second housing and facing the first coil;
a second coil facing the magnet;

a first elastic member connecting the bobbin and the second housing; and a second elastic member connecting the first housing and the second housing;

wherein the second coil is spaced apart from the first housing, wherein the magnet comprises a first magnet portion and a second magnet portion opposite to the first magnet portion with respect to an optical axis, wherein the second coil comprises a first coil portion facing the first magnet portion and a second coil portion facing the second magnet portion, and wherein a direction of a current applied to the first coil portion is opposite to a direction of a current applied to the second coil portion.

* * * * *